(12) United States Patent
Remick

(10) Patent No.: US 10,624,309 B2
(45) Date of Patent: Apr. 21, 2020

(54) CAT LITTER BOX

(71) Applicant: Karen Remick, Fairbanks, AK (US)

(72) Inventor: Karen Remick, Fairbanks, AK (US)

( * ) Notice: Subject to any disclaimer, the term of this patent is extended or adjusted under 35 U.S.C. 154(b) by 0 days.

(21) Appl. No.: 16/455,560

(22) Filed: Jun. 27, 2019

(65) Prior Publication Data

US 2019/0313595 A1 Oct. 17, 2019

Related U.S. Application Data

(63) Continuation-in-part of application No. 15/674,201, filed on Aug. 10, 2017, now Pat. No. 10,375,923.

(51) Int. Cl.
*A01K 1/00* (2006.01)
*A01K 1/01* (2006.01)

(52) U.S. Cl.
CPC .................. *A01K 1/0114* (2013.01)

(58) Field of Classification Search
CPC ...... A01K 1/00; A01K 1/0114; A01K 1/0107; A01K 1/0121
USPC .................. 119/166, 161, 162, 165
See application file for complete search history.

(56) References Cited

U.S. PATENT DOCUMENTS

| | | | | |
|---|---|---|---|---|
| 3,688,742 A * | 9/1972 | McGee | A01K 1/0121 | 119/162 |
| 4,627,383 A * | 12/1986 | Metzger | A01K 1/0107 | 119/161 |
| 4,649,578 A * | 3/1987 | Vargo | A01K 1/0114 | 119/161 |
| 4,926,794 A * | 5/1990 | Yamamoto | A01K 1/0107 | 119/165 |
| 5,042,430 A * | 8/1991 | Casmira | A01K 1/0107 | 119/161 |
| 5,103,772 A * | 4/1992 | Schmid | A01K 1/0121 | 119/162 |
| 5,193,488 A * | 3/1993 | Walton | A01K 1/0107 | 119/166 |
| 5,289,800 A * | 3/1994 | Walton | A01K 1/0107 | 119/165 |
| 5,454,349 A * | 10/1995 | Bondurant | A01K 1/0107 | 119/166 |
| 5,458,089 A * | 10/1995 | Rymer | A01K 1/0121 | 119/162 |
| 5,499,610 A * | 3/1996 | Bruner | A01K 1/0107 | 119/165 |
| 5,755,182 A * | 5/1998 | Brown, Jr. | A01K 1/0114 | 119/165 |
| 6,332,429 B1 * | 12/2001 | Gramlich | A01K 1/0107 | 119/165 |
| 6,487,989 B2 * | 12/2002 | Yamamoto | A01K 1/0114 | 119/161 |
| 6,662,748 B1 * | 12/2003 | Hanks | A01K 1/0107 | 119/165 |
| 6,745,719 B1 * | 6/2004 | Howerton | A01K 1/0114 | 119/166 |

(Continued)

*Primary Examiner* — Richard T Price, Jr.
(74) *Attorney, Agent, or Firm* — Mu P.C.

(57) ABSTRACT

A cat litter box has an open top enclosure provided with a bottom and sidewalls extending upward to form the enclosure. A lid with a central aperture configured to permit ingress and egress of a cat is provided to rest on the open top enclosure. The surface of the lid from the central aperture toward the perimeter is provided with a plurality of apertures to form a grated surface on the lid.

9 Claims, 11 Drawing Sheets

(56) References Cited

U.S. PATENT DOCUMENTS

| | | | | |
|---|---|---|---|---|
| 7,114,459 | B2* | 10/2006 | Schmidt | A01K 1/0114 119/161 |
| 7,395,784 | B2* | 7/2008 | Hirokawa | A01K 1/0107 119/161 |
| 8,051,804 | B1* | 11/2011 | Rescate | A01K 1/0121 119/162 |
| 8,327,802 | B2* | 12/2012 | Matsuo | A01K 1/0114 119/166 |
| 8,505,486 | B2* | 8/2013 | Trussardi | A01K 1/0152 119/169 |
| 8,656,863 | B2* | 2/2014 | Havluciyan | A01K 1/0107 119/165 |
| 8,671,888 | B1* | 3/2014 | Lei | A01K 1/0121 119/162 |

\* cited by examiner

CAT LITTER BOX

The present application is a continuation-in-part of U.S. Non-provisional patent application Ser. No. 15/674,201 filed on Aug. 10, 2017, entitled "CAT LITTER BOX" the entire disclosure of which is incorporated by reference herein.

BACKGROUND OF THE INVENTION

1. Field of Invention

The present invention relates to the field of cat litter boxes, and more particularly to a cat litter box that prevents litter from being scattered about and other animals from accessing the litter.

2. Description of Related Art

Conventionally, litter boxes are indoor solid and liquid waste collection boxes that are commonly used by cats. Cats may enter the litter box to relieve themselves of waste, without having to go outside. Because cats naturally excrete in soft soil which permits easy burial of the waste, the litter box is filled with a litter box filler commonly made of a loose granular material that absorbs moisture and odor. Waste may collect in the litter box for a period of time until cleaning is eventually required.

Litter boxes are generally constructed with a base integrally molded to surrounding walls that retain the filler within the box. The box may have a lid with an aperture for the cat to ingress and egress from the litter box. Alternatively, the aperture may be positioned on one of the sidewalls. Litter scatter around the box is a problem due to the activity of the animals within the litter box, and the fine granularity of litter. In addition, most regular litter boxes are shallowly filled, because of their low sidewalls, which makes cat sand sticking to the bottom of the box a problem.

A common problem with the aforementioned design is that other animals, namely dogs, can access the litter box. Unfortunately, dogs are naturally drawn to and even enjoy the cat excrement causing numerous health problems. Specifically, canine coprophagia may cause intestinal blockage, and promote the transmission of parasites present in cat feces such as a *Toxoplasma gondii*.

Based on the foregoing, there is a need in the art for a cat litter box that can be utilized by cats while restricting other animals from accessing the waste contents stored therein.

SUMMARY OF THE INVENTION

A cat litter box has an open top enclosure formed by at least three sidewalls extending from a bottom. A removable lid is configured to rest on the open top enclosure and be secured onto the enclosure with a plurality of fasteners.

The removable lid is provided with an aperture configured to allow the ingress and egress of a cat. A plurality of apertures on the surface of the lid form a grated surface to aid in the removal if particles from a cat's paws. The open top enclosure is filled with litter and the lid is secured onto the enclosure with the fasteners to prevent accidental removal of litter from the enclosure.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
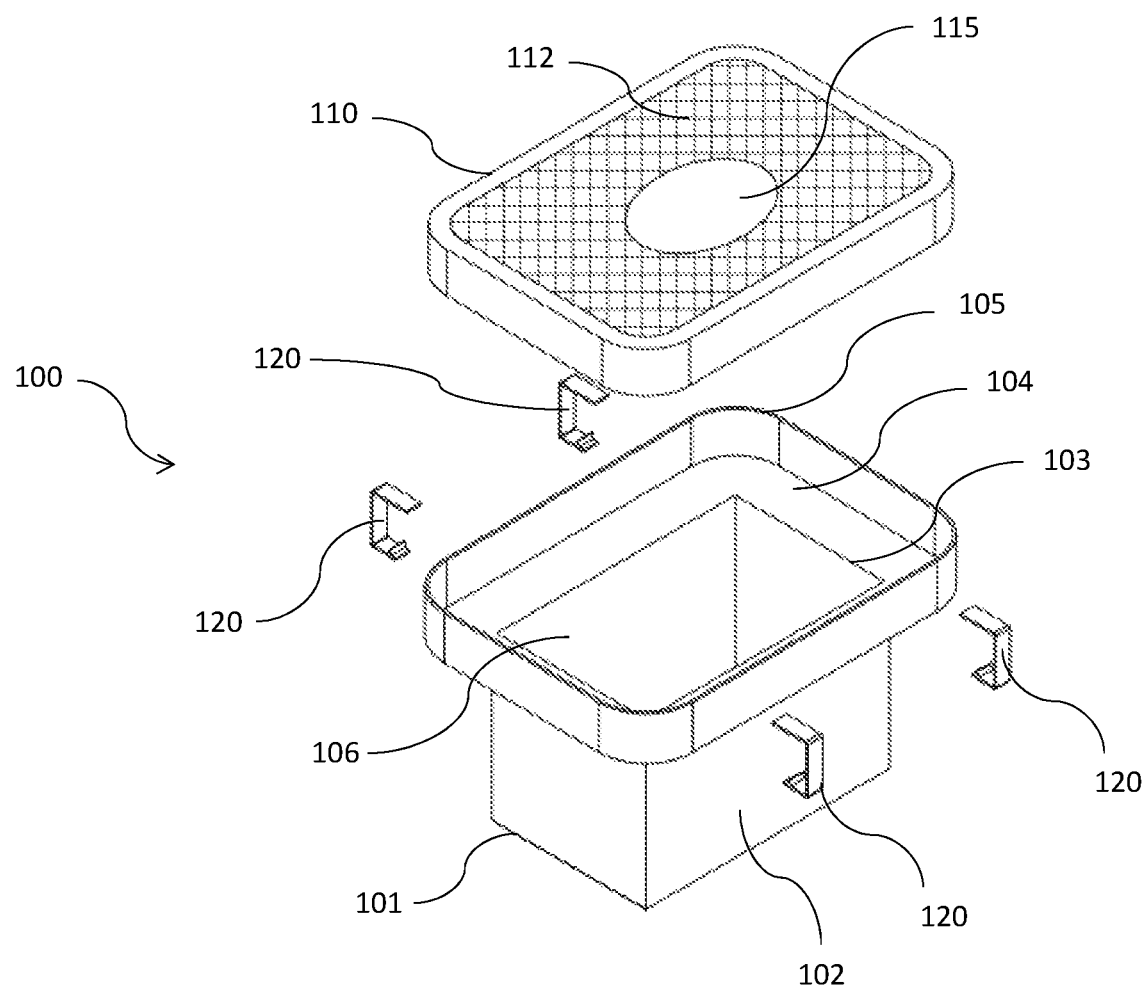
FIG. 1 is a perspective exploded view of the device, according to an embodiment of the present invention.

Preferred embodiments of the present invention and their advantages may be understood by referring to FIGS. 1-11, wherein like reference numerals refer to like elements.

In general, the invention described herein relates to a cat litter box designed to allow cats to enter and exit, while preventing dogs and other animals from accessing the filler and waste therein. The cat litter box 100 is preferably, but not necessarily, rectangular in shape. Alternate embodiments may be circular, or any suitable geometric shape wherein filler may be retained within.

In reference to FIG. 1 the cat litter box 100 is illustrated in an embodiment of the present invention. A box 101 having a horizontal bottom wall (not shown) sidewalls 102 extending substantially perpendicularly therefrom. The box 101 retains and collects the granular litter box filler and any excrement from the cat. The box 101 is a molded bathtub form that prevents litter scatter, and, in an embodiment, has smoothed corners to prevent accumulation of old litter. In an embodiment, the litter box is deep in comparison with prior art litter boxes, as it permits the addition an adequate amount of litter in it to prevent caking and sticking to the bottom, which also makes cleaning the box 101 easier.

The sidewalls 102 extend upwardly and meet in rounded corners 107 (shown in FIG. 6) to prevent the accumulation of litter in inaccessible corners. Each sidewall 102 terminates in a continuous rim 103 having a lip 104, extending substantially outwardly and perpendicularly therefrom, such that the lip 104 is on a parallel plane with the horizontal bottom wall. Preferentially, the lip 104 extends from each sidewall 102 and has a raised perimeter 105 extending substantially perpendicular from the lip 104, such that the raised perimeter 105 is parallel to the sidewalls 102. Each of the horizontal base, sidewalls 102, lip 104, and raised perimeter 105 are affixed, integrally molded, or otherwise in communication such that they define an interior 106 of the cat litter box 100. The interior 106 is dimensioned to retain and collect litter filler as well as excrement such as urine and feces from a cat. The interior 106 must be large enough for a cat to stand inside and move as needed throughout the natural process of excretion. The raised perimeter 105 defines an aperture such that there is no attached wall opposing the horizontal bottom wall.

In further reference to FIG. 1, a removable lid 110 component is suitably dimensioned to rest upon the lip 104 and retained within the raised perimeter 105 of the box 101. In an embodiment, the lid 110 has rounded corners. In this manner, the removable lid 110 mates with the lip 104 and raised perimeter such that the top surface of the lid 110 is coplanar with the top edge of the raised perimeter 105. This enables the lid 110 to be positively retained with in the perimeter 105. The height of the lid 110 corresponds with the depth of the perimeter, such that the top of the lid is flush with the perimeter 105. The lid 110 is held in place by a plurality of fasteners 120. Once the lid 110 is positioned on the lip 104 and within the raised perimeter 105, one or more fasteners 120 may be mounted to retain the lid 110 in a fixed position.

The removable lid 110 may substantially be a grate 112 having an aperture 115 adequately sized to permit a cat to ingress and egress therethrough. The aperture 115 may be positioned near the center of the lid 110 to promote the cat stepping on the grate 112 upon ingress and egress through the aperture 115. The aperture 115 is positioned so only medium and large dogs would be able to reach it, and sized small enough to prevent the head of a large or medium sized dog from entering. The position of the aperture requires a cat step onto the grate 112 when egressing the litter box 100. The grate 112 may be textured such that as the cat steps upon it, particles are removed from the cat's paws.

The central positioning of the aperture may further aid in prohibiting unwanted animals such as dogs, from accessing the interior 106 of the litter box. The grate also prevents small dogs from walking towards the aperture across the lid. The height of the walls makes the lid difficult to get to, and dogs do not like walking on grating. Further, the high walls and grating on the lid prevent litter scatter when the cat kicks the litter to cover what was emitted.

In an embodiment, each sidewall 102 extends generally vertically on a continuous plane allowing for easy cleaning of the litter box. In this manner, the one may clean the litter box with an appropriately sized means for cleaning without having to navigate and bumps, ridges, or channels on the shape of the sidewalls 102.

Figure 2:
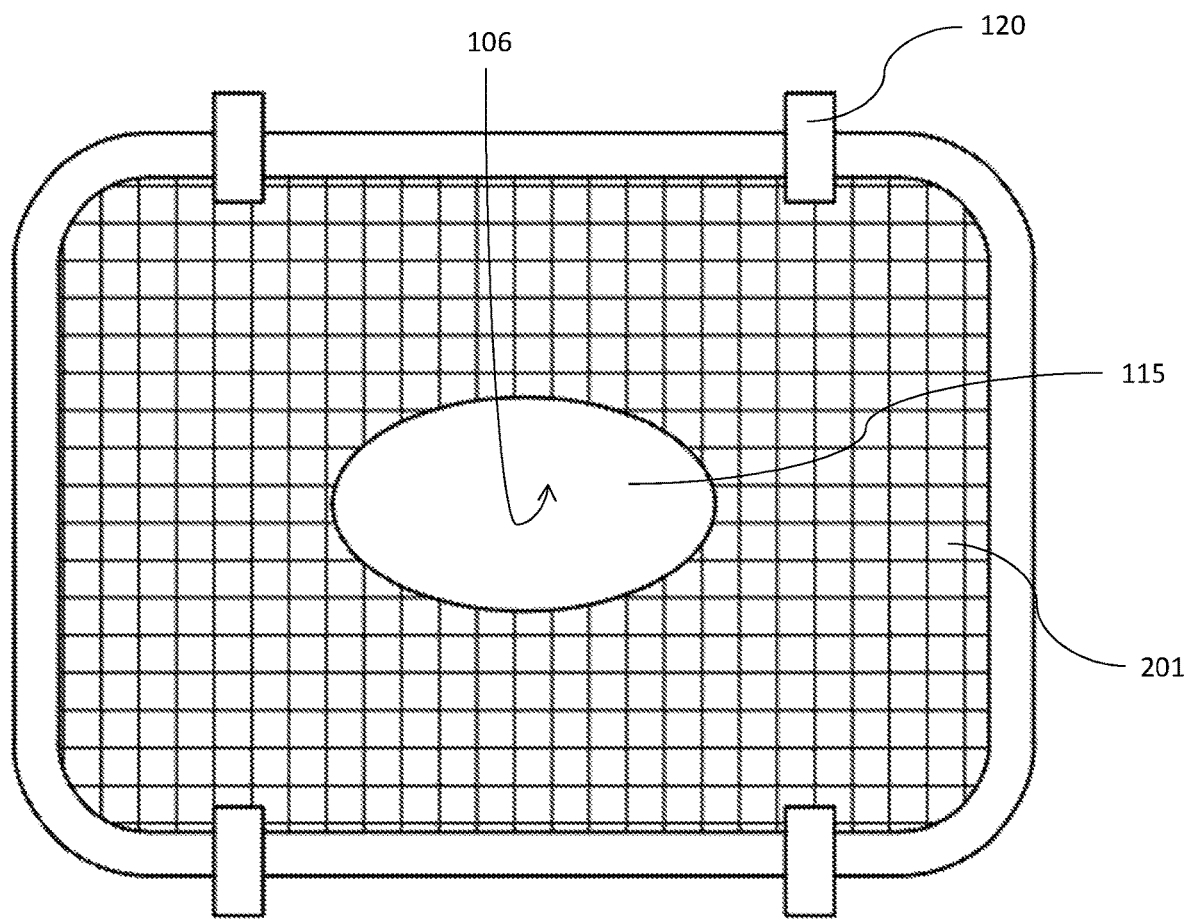
FIG. 2 is a top plan view of the device with the lid engaged, according to an embodiment of the present invention.

In reference to FIG. 2, a top plan view of the device 100 having the lid positioned upon and fastened to the box 101. The grate 112 has a porous top surface to permit particles stuck to the paws of the cat to fall into the interior 106. Pores 201 are sized such that particles, namely litter box filler, may fall through while the cat's paws, and animals aside from cats, are retained atop lid 110 or outside of the device 100. In an embodiment, the lid comprises an aperture 115 therein for entry and exit of an animal, wherein the edges of the aperture 115 are curved to prevent injury to an animal.

In an embodiment, the grate 112 has a grate frame defining the perimeter of the grate 112 and provides stability for interior of the grate. The grate frame provides a means for coupling and supporting the grate 112 with the frame as well as coupling the lid 110 with the box 101, lip 104, and raised perimeter 105.

In an embodiment, the grate may be a grid of perpendicular members equally interspaced from one another. In further embodiments, the grid may have a checkerboard-like pattern of protrusions with apertures spaced therebetween to promote cleaning of the cat's paws after use of the litter box. The protrusions may also serve to prevent litter filler from being kicked or tracked out of the box.

Figure 3:
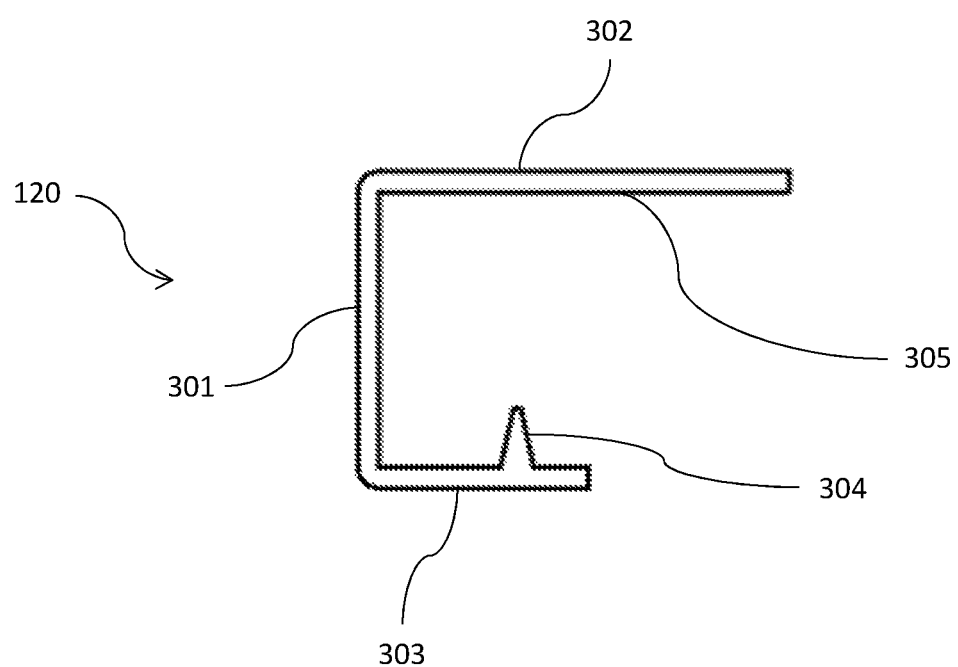
FIG. 3 is a side elevation view of the fastener, according to an embodiment of the present invention.

Now referring to FIG. 3, a side elevation view of the fastener 120 is illustrated. In a preferred embodiment, each of the plurality of fasteners 120 has two outwardly extending appendages extending substantially perpendicularly from opposite ends of a central portion 301. At least one of the appendages is a fastening portion 303 and at least one appendage is a mating portion 302, wherein the central portion 301 separates each of which. The central portion 301 is substantially perpendicular to the mating 302 and fastening portions 303. An inner surface 305 of the fastener 120 extends continuously along each portion 301, 302, 303. At least one appendage, and in a preferred embodiment the fastening portion 303 has a protrusion or tooth 304 extending from the inner surface 305.

In an embodiment, the fastener 120 is made of a semi-flexible material, such as molded plastic or bent metal, to allow the user to bend the appendages allowing for the engagement of the clip with the device 100.

The primary function of the fasteners is to keep the lid on against the efforts of dogs. Sufficiently intelligent dogs may discover that they just need to move the grate to get to the cat feces. Additionally, cats often launch themselves horizontally from the lid after using the litter box, and the fasteners prevent the cat from kicking the lid off the box. Finally, the fasteners protect the animal inside the chamber from external animals who wish to bother them.

Figure 4:
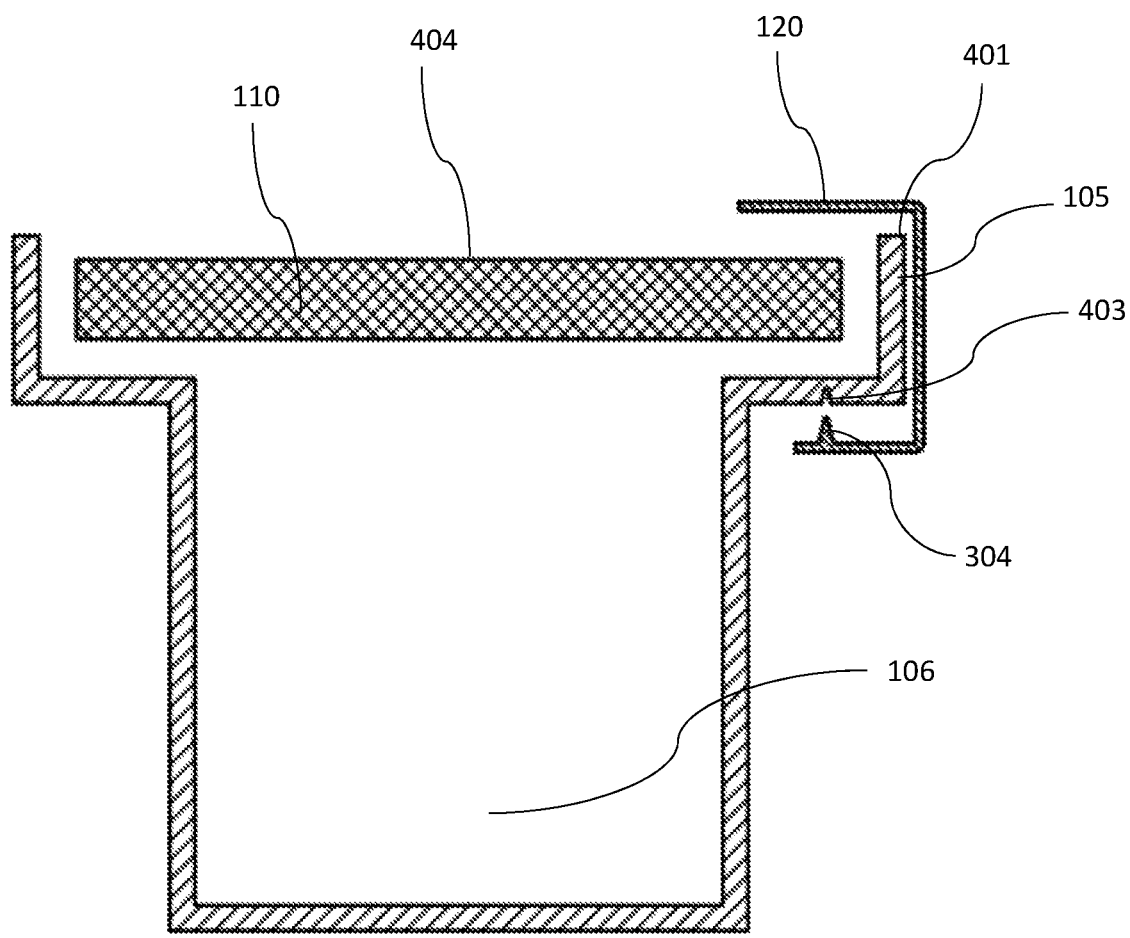
FIG. 4 is a side elevation view of the device, according to an embodiment of the present invention.
Figure 5:
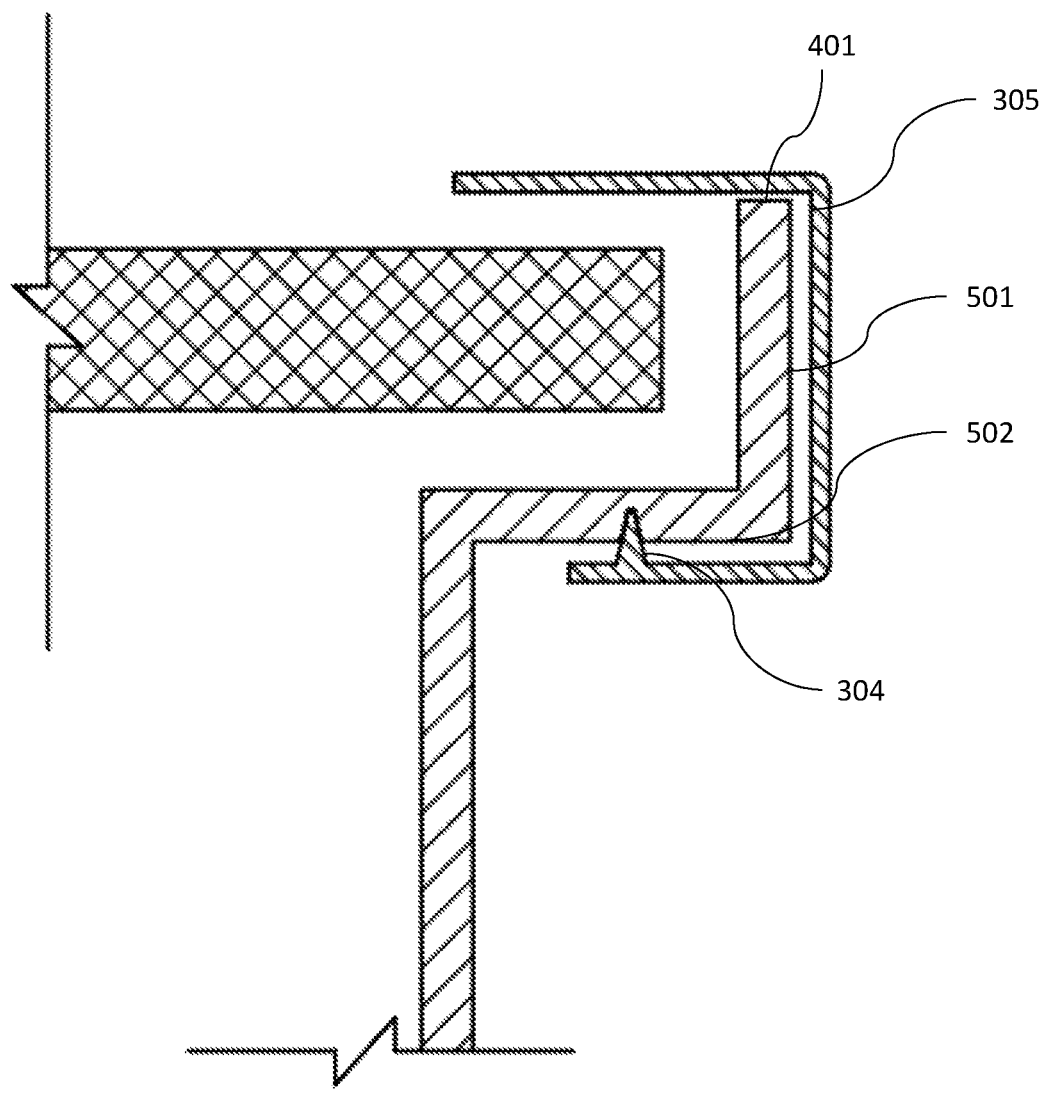
FIG. 5 is a cut-away side elevation view of the fastener engaged with the device, according to an embodiment of the present invention.
Figure 6:
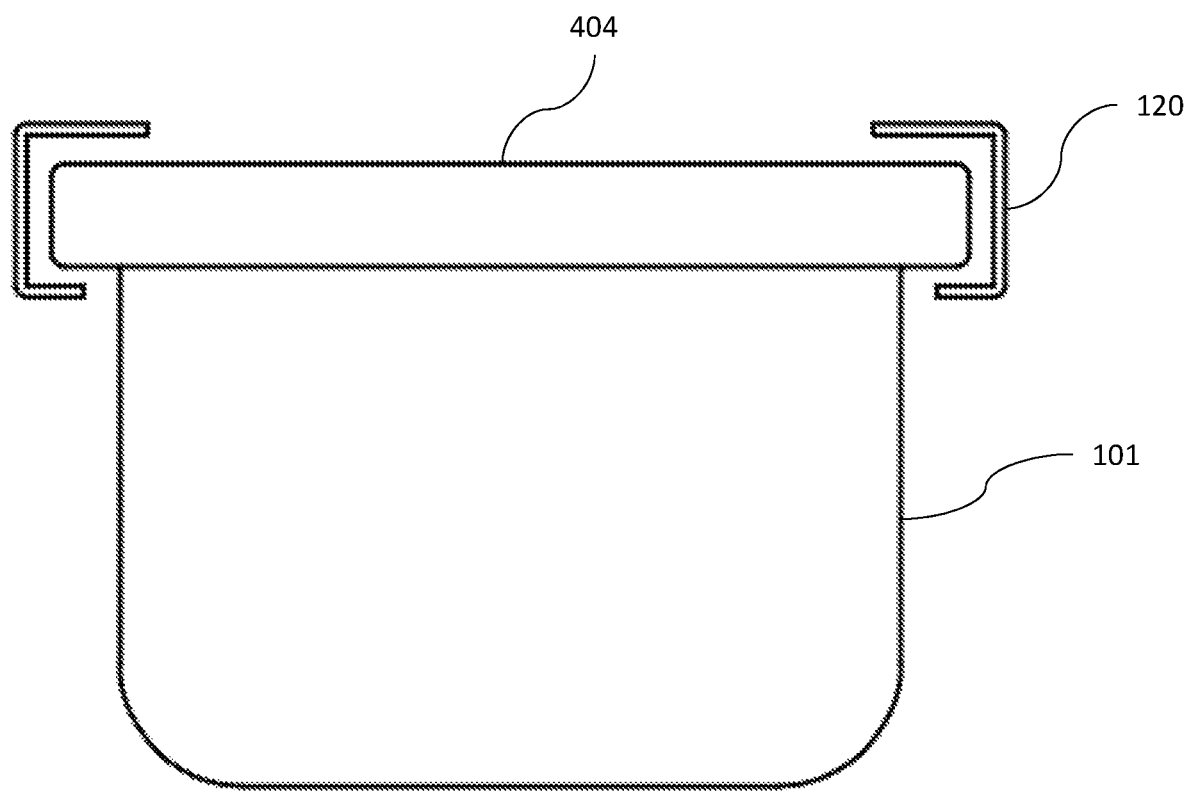
FIG. 6 is a side elevation view of the device, according to an embodiment of the present invention.

FIGS. 4, 5, and 6 illustrate the device having each fastener 120 engaged with the lid 110. In an embodiment of the present invention, the user may engage the fastener 120 by engaging the protrusion on the inner surface 305 with a receiving notch 403 on a bottom surface 502 of the lip, and with the upper surface 401 and the top of the lid 110 for the top portion of the fastener. In an embodiment, the receiving notch 403 comprises a groove or trough underneath and around the circumference of the bottom surface 502, permitting the clips to engage anywhere around the circumference of the top surface. When releasably engaged, the inner surface 305 of the fastener 120 contacts the bottom surface 502 of the lip 104 and the outer surface 501 upper surface 401 of the raised perimeter 105. Preferentially, a plurality of fasteners 120 are positioned around the raised perimeter 105 of the litter box. In an embodiment, the central portion of the contacts the substantially vertical outer surface 501 of the raised perimeter 105.

In an embodiment, at least one of the plurality of fasteners 120 may be releasably affixed to the lid 110. For example, the mating portion 302 of the fastener 120 may be releasably affixed to the top surface 404 of the lid 110. In this embodiment, the protrusion 304, in combination with the receiving notch 403 may be pivotally engaged to function as a pivot for the attachment of the fastener.

The litter box of the present invention may have any basic shape provided that the aperture permits the entrance of cats and restricts the access of dogs and other animals that may feed on the contents therein. The box 101 may be constructed of a variety of metallic and nonmetallic materials such as plastics, aluminum, or fiberglass. It is desirable that the box 101 and sidewalls 102 are impermeable, odor resistant, and mold resistant. The lid is constructed of a sufficiently rigid material to bear the weight of an animal atop the litter box. In all embodiments of the present invention, the lid 110 is removable to facilitate cleaning of the litter box. In alternate embodiments, the lid may be hingedly or slidingly engaged with the box 101.

As described, the dimensions of the litter box and each of the components thereof aid in retaining litter filler and pet waste within the box, as well as keeping unwanted animals, such as dogs, out. In an embodiment, the height from the horizontal base to the top surface of the grate is sized to allow cats to jump onto the top surface 404 (see FIG. 4), while making it difficult for other animals, such as small dogs, to jump atop. Perforations of the grate are dimensions to promote particle disassociation with the cat's paws while restricting appendages from entering the interior of the litter box. The aperture is dimensioned to permit access of a cat while restricting other animals from accessing the interior of the litter box. In a preferred embodiment, the aperture is oblong, having a length greater than a width. The dimensions of the aperture may be ten inches by six inches to achieve the above.

In an embodiment, the height of each sidewall 102 is higher than the average height of a cat's head, in an embodiment, about 4 inches above the cat's head accounting for the litter fill. In an alternate embodiment, the height of each sidewall is at least eight inches. In a preferred embodiment, the height of each sidewall is sixteen inches. Adequate height of the box 100 ensures that the cat within does not throw filler outside of the box 100 when burying excrement, as well as ensuring dogs cannot access the interior 106. The grate also serves as a filter to catch litter moving generally horizontally, reducing litter spread outside the litter box.

In an embodiment, at least the box 101 of the device 100 can be made of an antimicrobial or antibacterial material such, such as plastic embedded with silver particles, or likewise agents as known in the antibacterial/antimicrobial arts. The grate 112 may also be made of an antimicrobial or antibacterial agent.

Figure 7:
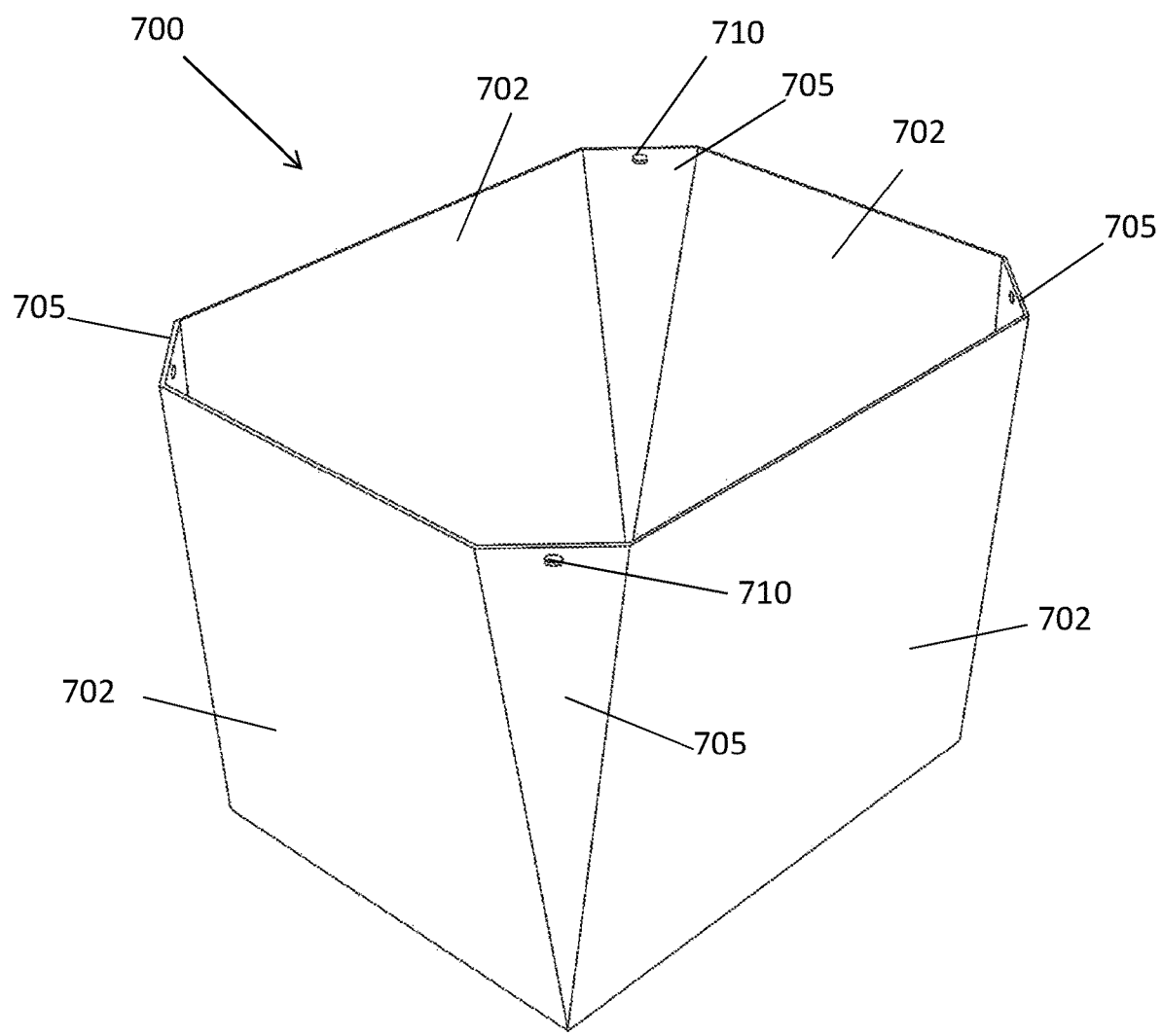
FIG. 7 is a perspective view of the box of the device, according to an embodiment of the present invention.

With reference to FIG. 7, an embodiment of the box 700 is shown. In the embodiment, the box includes a horizontal bottom wall (not shown) with sidewalls 702 extending upward and outward from the bottom wall. The box 700 retains and collects the granular litter box filler and any excrement from the cat. In an embodiment, the litter box is deep in comparison with prior art litter boxes, as it permits the addition an adequate amount of litter in it to prevent caking and sticking to the bottom, which also makes cleaning the box 700 easier. The outward taper of the sidewalls 702 allows the boxes to nest within one another for shipping and storage purposes.

In an embodiment, the box 700 includes beveled corners 705. The beveled corners provide a flat surface to engage with the lid and fasteners at the corners of the box. Each beveled corner is provided with a through hole 710, to receive the end of a fastener. In an embodiment, the width of the bevel tapers from the top of the box towards the bottom of the box.

Figure 8A:
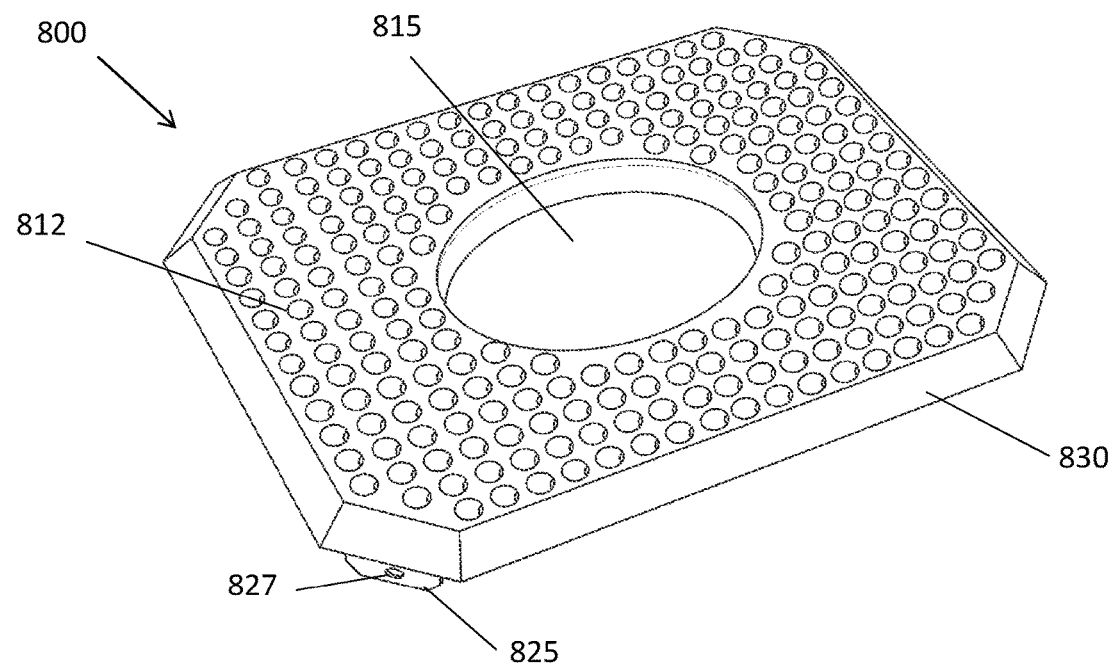
FIG. 8A is a top perspective view of the lid of the device, according to an embodiment of the present invention.
Figure 8B:
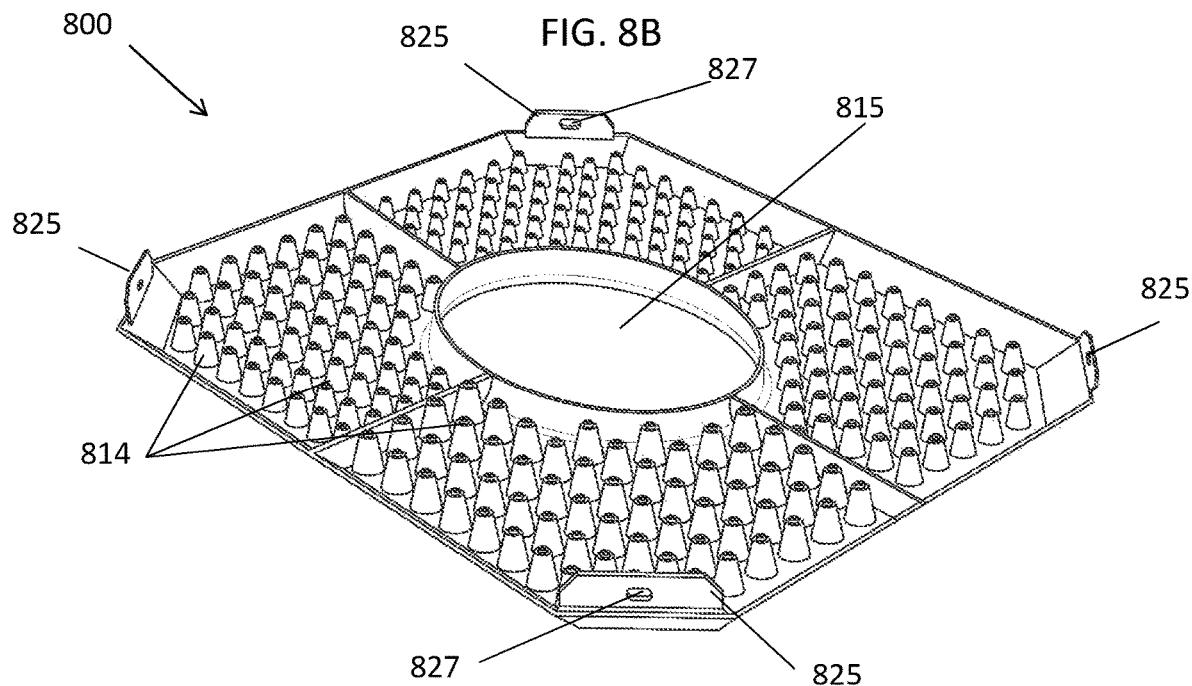
FIG. 8B is a bottom perspective view of the lid of the device, according to an embodiment of the present invention.

With reference to FIGS. 8A and 8B, an embodiment of the lid 800 is depicted. In the embodiment, the lid comprises a central aperture 815 adequately sized to permit a cat to ingress and egress therethrough. The lid further comprises a plurality of holes to form a grate 812 on the top surface of the lid. The aperture 815 is positioned near the center of the lid 800 to promote the cat stepping on the grate 812 upon ingress and egress through the aperture 815. As the cat steps on the grate, the toes of the cat are spread apart, removing particles which may have accumulated between their toes. Centering the aperture on the grate also prevents a dog from reaching the contents of the litter box, as a large or medium sized dog would have to contort its neck reach into the box. The position of the aperture requires a cat step onto the grate 812 when egressing the litter box.

In an embodiment, each aperture which forms the grate is one end of a protrusion 814 extending downward from the top surface of the lid. Each protrusion terminates at a second aperture. In an embodiment, each protrusion 814 is frustoconical in shape and tapers inwardly from the top surface of the lid such that the aperture at the top surface of the lid is larger than the second aperture.

The apertures of each protrusion are significantly smaller than the length of the protrusion to prevent cat litter from escaping the box, filtering out particles with any significant amount of horizontal motion. In an embodiment, the protrusions 814 extend 1 inch from the top surface of the lid, and each aperture at the top surface of the lid, which collectively form the grate 812, is circular with a one-quarter inch diameter. Said dimensions produce a 4 to 1 ratio of the aperture diameter compared to the protrusion length.

In an embodiment with a frustoconical protrusion having an aperture 4:1 aperture diameter to protrusion length ratio, the angle needed for a particle to escape is between 76-104 degrees from the horizontal. Such a particle would not travel far enough during its flight time, above the grate, to move away from the box. As a result, the particle falls back onto the grate and is funneled back into the box, eliminating litter scatter.

In an embodiment, the lid is further comprised of a perimeter 830 surrounding the grate. A fastening tab 825 is provided at each corner of the lid. In an embodiment, the fastening tabs protrude downward from the perimeter. Each fastening tab is provided with an aperture to receive a fastener. In an embodiment, the aperture is oblong to provide for interaction with fastener locking mechanism.

Figure 9A:
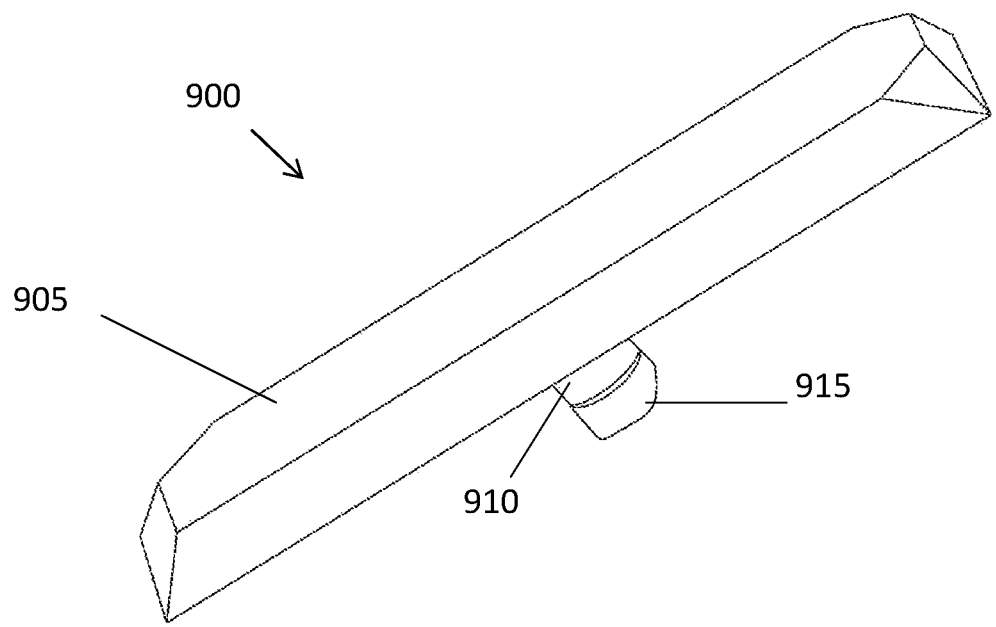
FIG. 9A is a front perspective view of the fastener; according to an embodiment of the present invention.
Figure 9B:
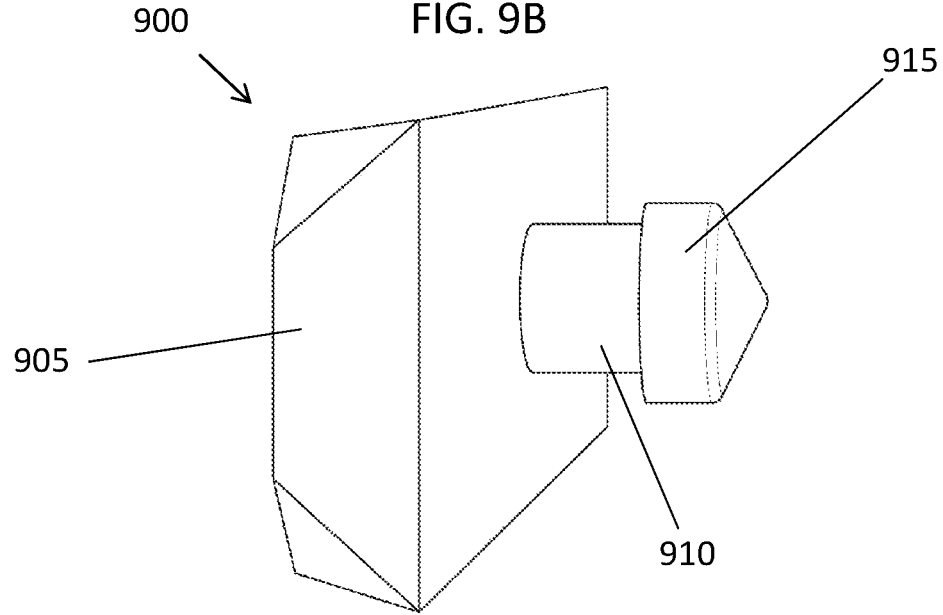
FIG. 9B is a side perspective view of the fastener; according to an embodiment of the device.

With reference to FIGS. 9A and 9B, an embodiment of the fastener component 900 is depicted. The fastener is comprised of a body 905, which may include beveled corners. A protrusion 910 extends outward from the body at one end and includes a flared and pointed tip 915 at the other end. The flare is oblong and does not outwardly from the center axis of the protrusion equally. In an embodiment, the tip 915 is configured to be inserted into the corresponding apertures of the lid and box (The point of the tip is designed to aid in insertion into an appropriately sized aperture.

Figure 10:
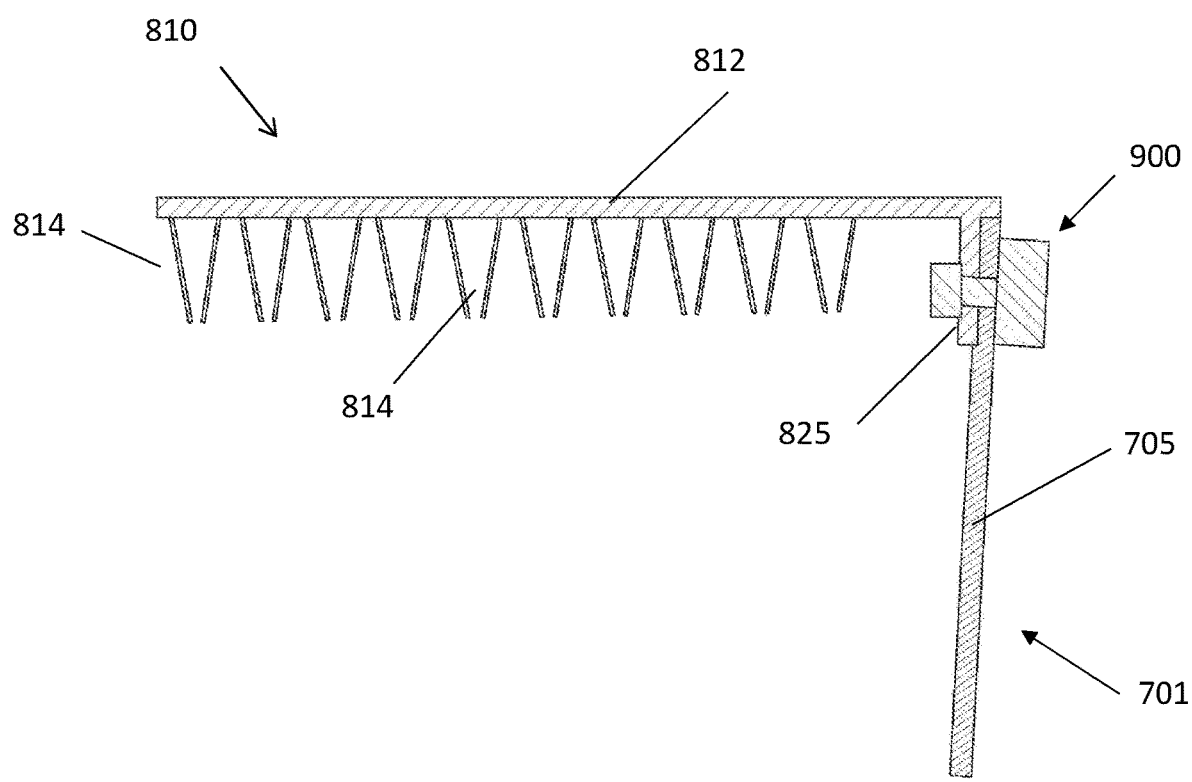
FIG. 10 is a cut-away side elevation view of the fastener engaged with the device, according to an embodiment of the present invention.

With reference to FIG. 10, a cross section view of a fastener 900 is depicted securing lid 800 to box 700 by insertion through the apertures of the fastening tab 825 of the lid and beveled corner 705 of the box. The fastener 900 is inserted into the apertures of the fastening tab and beveled corner such that the flared tip 915 of the fastener passes all the way through the apertures provided on both the lid and the box and is rotated 90 degrees to lock the parts together. In an embodiment, fastening tabs and beveled corners are comprised of the same materials as the box and grate.

In the embodiment, because the fasteners are inserted at the beveled corners of the box, the fasteners will be accessible even when the box is placed against a corner or alcove.

Figure 11:
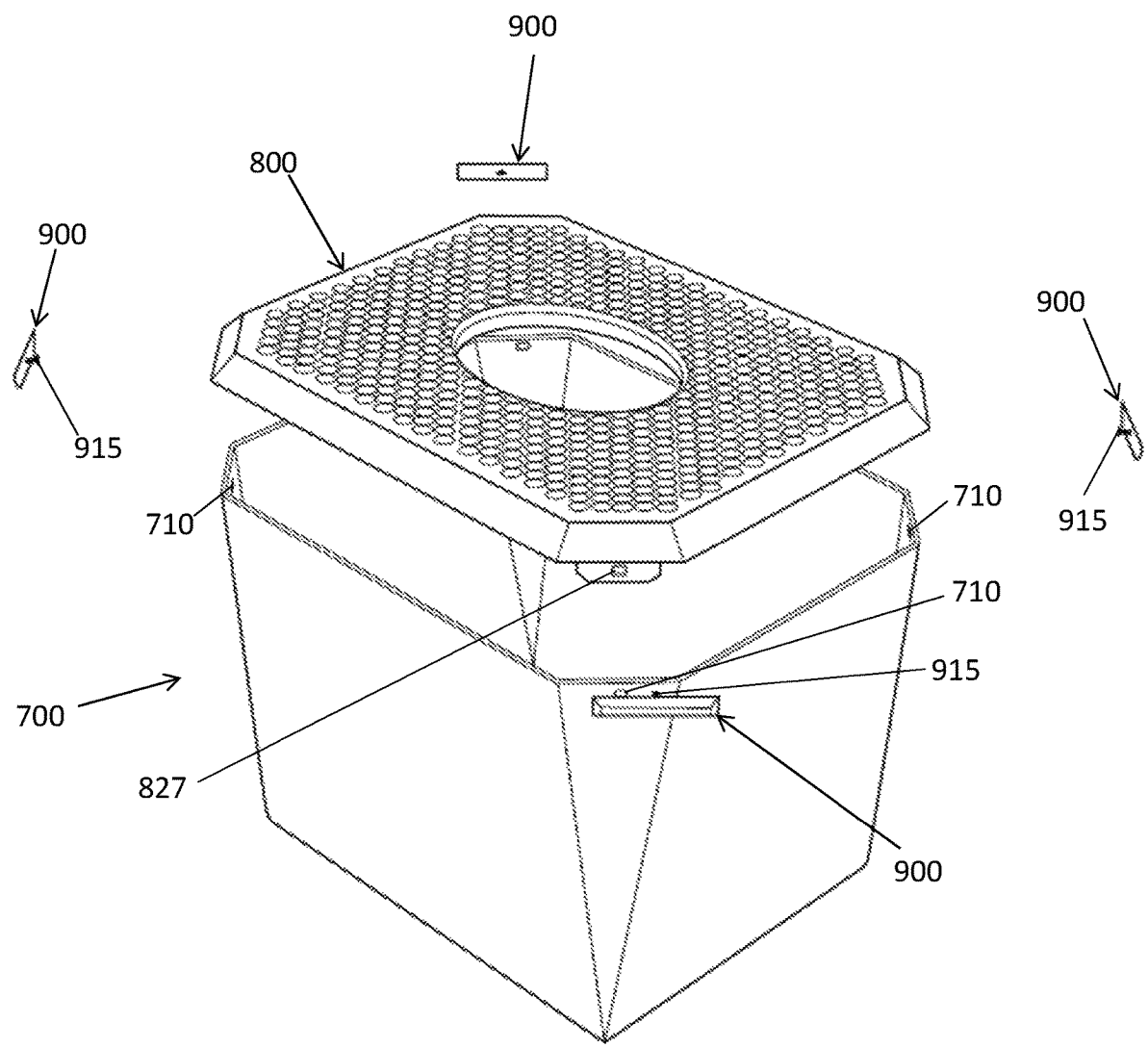
FIG. 11 is a perspective exploded view of the device, according to an embodiment of the present invention.

According to an embodiment, with reference to FIG. 11, an embodiment of the cat litter box is provided with box 700, lid 800, and fastener 900 components. Lid 800 is placed onto the box 700, and the protrusions 910 of the fasteners 900 are placed through the fastening apertures of the box 710 and lid 827, respectively. The fasteners are then rotated 90 degrees to lock into place. In an embodiment, the fastener is oriented vertically for insertion and rotated 90 degrees to a horizontal position to lock into place.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A cat litter box comprising:
   an open top enclosure having a bottom and at least three sidewalls extending upward from the bottom;
   a lid having a central aperture therein, the lid configured to rest on the open top enclosure, the central aperture configured to permit ingress and egress of a cat, the lid further comprised of a plurality of grate apertures forming a grated surface on the lid;
   wherein the lid further comprises a plurality of protrusions, each protrusion having a first end formed by one of the grate apertures and a length extending downward into the open top enclosure when the lid rests on the open top enclosure.

2. The cat litter box of claim 1, wherein each protrusion further comprises a second aperture is provided at a second end of the protrusion.

3. The cat litter box of claim 2, wherein each protrusion is substantially frustoconical, and wherein the diameter of the grate apertures is greater than the diameter of the second apertures.

4. The cat litter box of claim 3, wherein the length of each protrusion is at least four times greater than the diameter of each grate aperture.

5. The cat litter box of claim 3, wherein the length of each protrusion is at least four times greater than the diameter of each second aperture.

6. A cat litter box comprising:
   an open top enclosure formed by a substantially rectangular bottom, four sidewalls extending upward from the substantially rectangular bottom, and four beveled corners connecting adjacent sidewalls;
   a lid having a central aperture and a grated surface, the lid configured to rest on the open top enclosure, the central aperture configured to permit ingress and egress of a cat;
   wherein the grated surface is comprised a plurality of grate apertures;
   wherein each grate aperture forms one end of a protrusion, and wherein the opposite end of the protrusion is provided with a second aperture;
   wherein each protrusion is substantially frustoconical, and wherein the second aperture is provided with smaller diameter than the grate aperture.

7. The cat litter box of claim 6, wherein the length of each protrusion is at least four times greater than the diameter of each grate aperture.

8. The cat litter box of claim 6, wherein the length of each protrusion is at least four times greater than the diameter of each second aperture.

9. The cat litter box of claim 6, wherein the grate apertures and the second apertures are substantially circular.

* * * * *